United States Patent
Rao et al.

(10) Patent No.: US 8,203,498 B2
(45) Date of Patent: Jun. 19, 2012

(54) THREE-FOLD POLARIZATION DIVERSITY ANTENNA

(75) Inventors: Qinjiang Rao, Waterloo (CA); Geyi Wen, Waterloo (CA); Dong Wang, Waterloo (CA)

(73) Assignee: Research In Motion Limited, Waterloo, ON ( * ) Notice: Subject to any disclaimer, the term of this patent is extended or adjusted under 35 U.S.C. 154(b) by 369 days.

(21) Appl. No.: 12/254,002

(22) Filed: Oct. 19, 2008

(65) Prior Publication Data

US 2010/0097274 A1  Apr. 22, 2010

(51) Int. Cl.
*H01Q 13/00* (2006.01)

(52) U.S. Cl. .................. 343/770; 343/700 MS

(58) Field of Classification Search .......... 343/700 MS, 343/702, 705, 713, 725, 727, 729, 745, 746, 343/749, 753, 754, 756, 767, 769, 770, 771, 343/781 R, 787, 789, 795, 797, 810, 815, 343/818, 824, 829, 830, 840, 844, 846, 850, 343/853, 860, 872, 893, 895, 906, 909
See application file for complete search history.

(56) References Cited

U.S. PATENT DOCUMENTS

| | | | |
|---|---|---|---|
| 4,242,685 A | 12/1980 | Sanford | |
| 4,443,802 A * | 4/1984 | Mayes | 343/729 |
| 4,684,953 A | 8/1987 | Hall | |
| 5,402,132 A * | 3/1995 | Hall et al. | 342/432 |
| 6,593,891 B2 | 7/2003 | Zhang | |
| 6,750,826 B2 * | 6/2004 | Schultze et al. | 343/767 |
| 7,336,233 B2 | 2/2008 | Thudor | |
| 7,358,916 B2 | 4/2008 | Milyakh | |
| 2005/0200543 A1 * | 9/2005 | Shtrikman et al. | 343/767 |

* cited by examiner

*Primary Examiner* — Tan Ho

(74) *Attorney, Agent, or Firm* — Moffat & Co.

(57) ABSTRACT

A three-fold polarization diversity antenna comprises a slot-loaded patch, and a radiation member that is electromagnetically coupled to the slot-loaded patch. The radiation member extends through a plane of the slot-loaded patch.

15 Claims, 5 Drawing Sheets

THREE-FOLD POLARIZATION DIVERSITY ANTENNA

FIELD

This patent application relates to an antenna apparatus. In particular, this patent application relates to an antenna having polarization diversity.

BACKGROUND

The electric field of a propagating electromagnetic wave has two linear components that are orthogonal to one another. Typically, these components trace out an ellipse as a function of time. However, the electromagnetic wave might have only a single electric field component, in which case the electromagnetic wave is said to be linearly polarized.

If an electromagnetic wave is linearly polarized, signal quality may be adversely affected by multipath signals, since many linearly polarized signals with different polarization might exist at the receiving antenna. A polarization diverse antenna can be used to improve signal transmission/reception quality in multipath environments since the signal strength received by such antennas can be greater than with a single linearly polarized antenna. A polarization diverse antenna can also be used to increase network capacity since multiple signals of the same frequency, but different polarizations, can be transmitted from and/or received at a single antenna.

Conventional linear polarization diversity antennas may have two feed/receive lines that transmit/receive two respective orthogonal components of the electromagnetic wave. For example, Zhang (U.S. Pat. No. 6,593,891) describes a polarization diverse antenna that comprises a dielectric substrate having an upper conductive surface. A cross-shaped slot is formed in the upper conductive surface. The lower surface of the dielectric includes elongated conductive strips that are aligned with the arms of the slot, and a rectangular conductive portion that is aligned with the centre of the slot. The antenna also includes a pair of feed lines, each attached to a respective one of the conductive strips.

Alternately, a linear polarization diversity antenna may have a single feed/receive line, but have a complex structure to transmit/receive the orthogonal components of the electromagnetic wave. For instance, Thudor (U.S. Pat. No. 7,336,233) describes a polarization diverse antenna that comprises five slots that are arranged in a H-shaped structure on the upper surface of a dielectric substrate. A single feed line is disposed on the lower surface of the dielectric substrate, and is perpendicular to the centre slot. The antenna also includes a switching means that are positioned in the middle of each slot, except the middle slot. Similarly, Milyakh (U.S. Pat. No. 7,358,916) describes a polarization diverse antenna that comprises four right-angled bent conductive strips that are disposed on a dielectric substrate. The antenna also includes a switching network comprising diodes that are formed between the ends of adjacent strips. A single feed line is connected between the diagonally opposite strips, at the bent portion thereof.

A common problem of dual-polarized antenna is the high possibility of cross-talk between the polarized components.

BRIEF DESCRIPTION OF THE DRAWINGS

Sample embodiments of a three-fold polarization diversity antenna and a wireless communications device incorporating a three-fold polarization diversity antenna will now be described, with reference to the accompanying drawings, in which.

DETAILED DESCRIPTION

By way of overview, in a first aspect this patent application describes a three-fold polarization diversity antenna that comprises a slot-loaded patch, and a radiation member that is electromagnetically coupled to the slot-loaded patch. The radiation member extends through a plane of the slot-loaded patch.

In a second aspect, this patent application describes a wireless communications device that comprises a radio transceiver section, and a three-fold polarization diversity antenna that is coupled to the radio transceiver section. The three-fold diversity antenna comprises a slot-loaded patch, and a radiation member that is electromagnetically coupled to the slot-loaded patch. The radiation member extends through a plane of the slot-loaded patch.

The radiation member may be disposed at a substantially right angle to the plane of the slot-loaded patch. The slot-loaded patch may comprise a pair of intersecting slots that extend through a planar conductive layer, with the intersecting slots being disposed at a substantially right angle to each other. The radiation member may terminate at one end within a central portion of the slot-loaded patch, such that the one end is physically isolated from the slot-loaded patch.

In one implementation, the slot-loaded patch comprises a cross-slot-shaped through-hole that extends through the planar conductive layer. The radiation member comprises a monopole that extends between a feed point and a centre of the cross-slot-shaped through-hole. The monopole may comprise a ground plane, and an elongate conductor that extends from the ground plane and terminates in the centre of the cross-through-hole. The ground plane may be substantially parallel to the planar conductive layer, with the elongate conductor being disposed at a substantially right angle to the planar conductive layer and the ground plane.

As will become apparent, the three-fold polarization diversity antenna has a simple compact structure. The antenna also provides good isolation between the polarized components, and may be used in WLAN networks.

Figure 1:
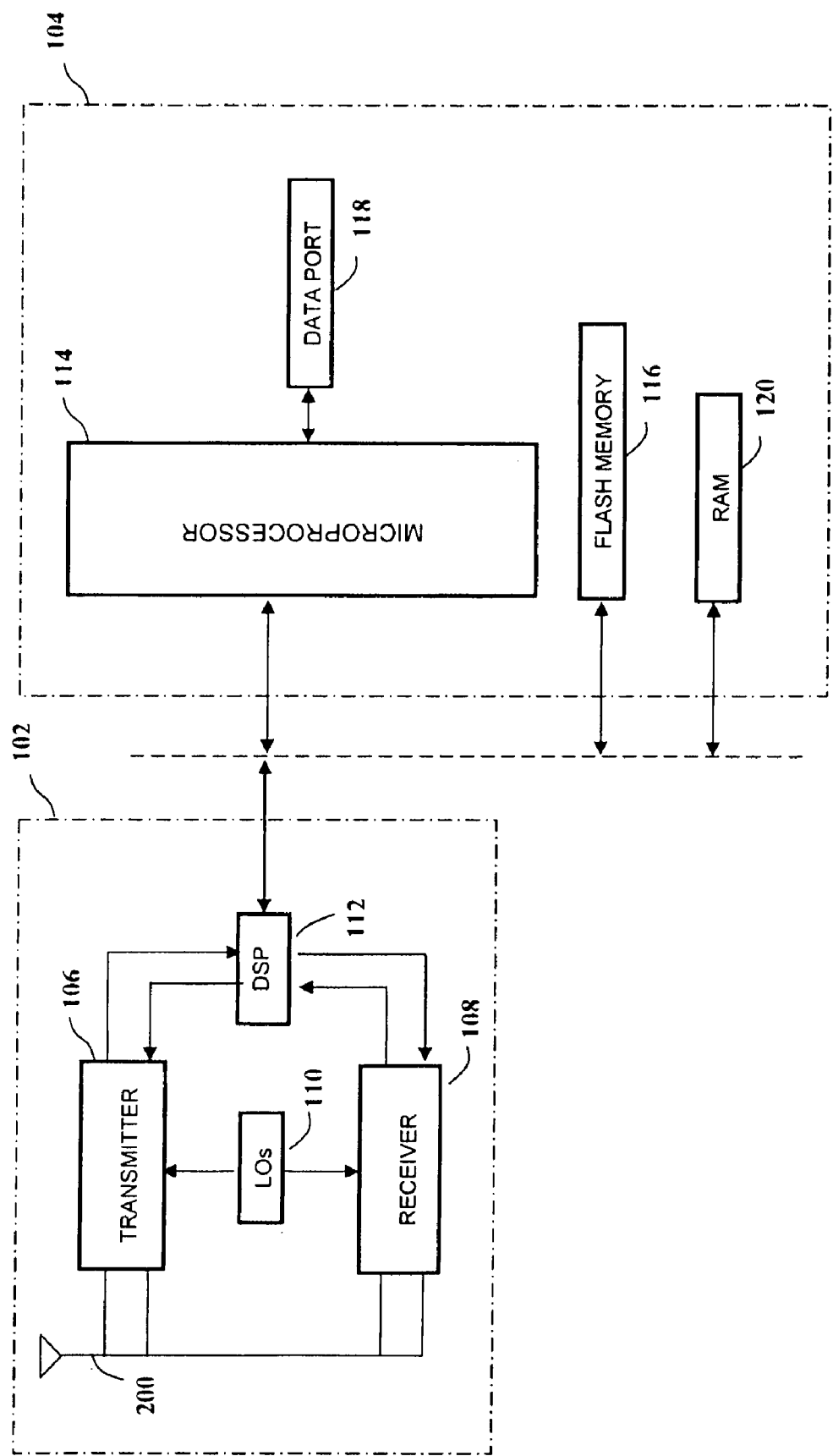
FIG. 1 is a schematic diagram depicting certain functional components of the wireless communications device, including the three-fold polarization diversity antenna.

Turning now to FIG. 1, there is shown a wireless communications device 100 that is configured to operate within a wireless network. Preferably, the communications device 100 is a two-way wireless communications device. Depending on the exact functionality provided, the wireless communications device 100 may be configured as a wireless base station, a portable wireless modem, or a wireless data communication device, as examples.

As shown, the wireless communications device 100 includes a communication subsystem 102, and a data processing system 104 that is coupled to the communication subsystem 102. The communication subsystem 102 performs communication functions, and includes a wireless transmitter 106, a wireless receiver 108, and an internal antenna 200, a local oscillator (LOs) 110 and a digital signal processor (DSP) 112 connected to the transmitter 106 and the receiver 108.

Preferably, the internal antenna 200 is a wide-band antenna that is configured for use with one or more of the application bands that are available within the wireless network. More preferably, the internal antenna 200 is configured for use within a WLAN (IEEE 802.11x) network. The internal antenna 200 will be discussed in detail below, with reference to FIGS. 2 to 5.

The data processing system 104 comprises a microprocessor 114, a flash memory 116 and a data port 118. The flash memory 116 includes signal processing instructions for the DSP 112, and may also includes computer processing instructions for the microprocessor 114. The computer processing instructions, when accessed from the flash memory 116 and executed by the microprocessor 114 define an operating system that controls the overall operation of the communications device 100. Alternately, the data processing system 104 may also include a volatile memory (RAM) 120. The computer processing instructions may be copied from the flash memory 116 into the RAM 120, and then accessed from the RAM 116 and executed by the microprocessor 114.

The data port 118 interfaces the wireless communications device 100 with a communications network, such as a wired or wireless local area network (LAN) or wide area network (WAN). Data packets that are received at the data processing system 104 from the communications network via the data port 118 are transferred by the operating system to the communication subsystem 102 for transmission as wireless electromagnetic signals over the wireless network. Wireless electromagnetic signals to be transmitted over the wireless network are processed by the DSP 112 and input to the transmitter 106 for digital to analog conversion, frequency up conversion, and transmission over the wireless network via the internal antenna 200.

Conversely, wireless electromagnetic signals that are received by the internal antenna 200 from the wireless network are input to the receiver 108, which performs common receiver functions such as frequency down conversion, and analog to digital (A/D) conversion, in preparation for more complex communication functions performed by the DSP 112. Data packets that are received at the data processing system 104 from the DSP 112 are transmitted by the operating system over the communications network via the data port 118.

Although the communication subsystem 102 is depicting in FIG. 1 having only one transmitter 106 and one receiver 108, the communication subsystem 102 may include additional transmitters and/or receivers, depending upon the range of frequency bands over which communication is desired. Similarly, although the communication subsystem 102 is depicted in FIG. 1 with one antenna 200, it should be understood that the wireless communications device 100 may instead comprise two or more of the antennas 200. Further, if the communication subsystem 102 includes more than one DSP 112, the signals transmitted and received by the additional transmitter(s)/receiver(s) would preferably be processed by a different DSP than the transmitter 106 and the receiver 108.

Figure 2A:
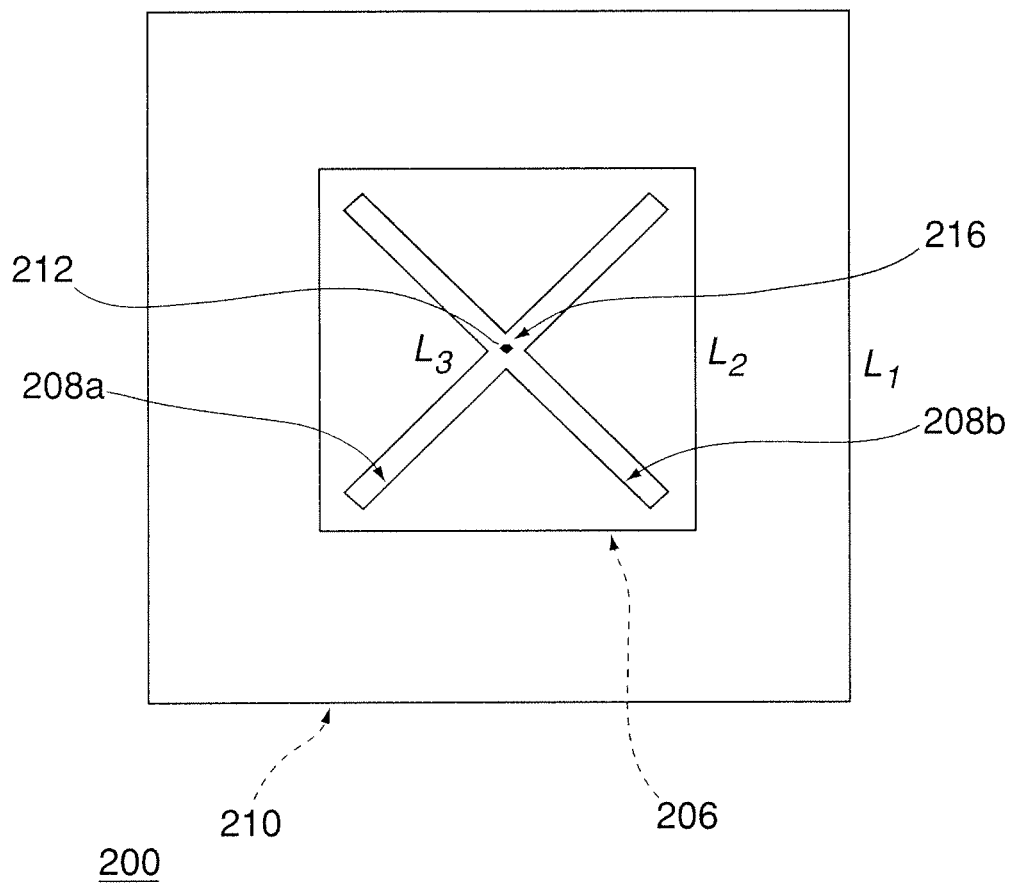
FIG. 2a is a top perspective view of the three-fold polarization diversity antenna, depicting the slot-loaded patch, and the radiation member.
Figure 2B:
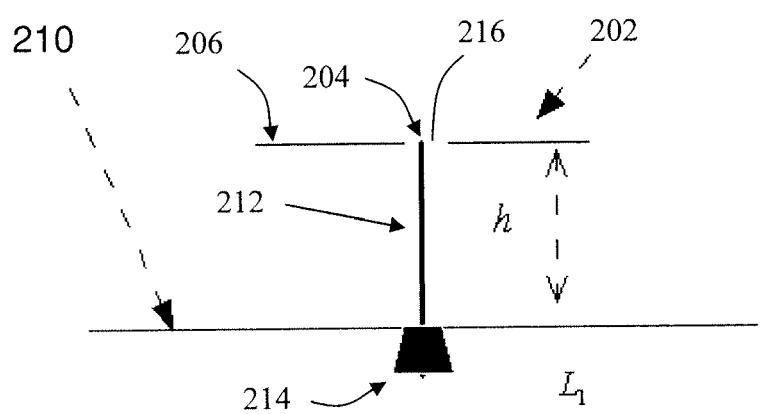
FIG. 2b is a side elevation of the three-fold polarization diversity antenna.

FIGS. 2a and 2b depict the preferred structure of the three-fold polarization diversity antenna 200. The antenna 200 comprises a slot-loaded patch antenna structure 202, and a radiation member 204 that is electromagnetically coupled to the patch antenna structure 202. The patch antenna structure 202 comprises a conductive layer 206, and a slot-shaped aperture that extends through the conductive layer 206. The conductive layer 206 typically is substantially planar, and may have a substantially square planar shape. Alternately, the conductive layer 206 may have rectangular, elliptical or circular planar shape. Further, the conductive layer 206 need not be planar, but may have an arcuate shape.

As shown, the slot-shaped aperture may comprise a pair of elongate linear intersecting slots 208a, 208b that extend through the conductive layer 206, between the upper and lower surfaces thereof, thereby forming a cross-slot-shaped through-hole in the conductive layer 206. Preferably, the intersecting slots 208a, 208b are disposed at a substantially right angle to each other. However, other orientations of the intersecting slots 208a, 208b may be adopted. For instance, the patch antenna structure 202 may comprise a single slot; or may comprise three linear intersecting slots oriented 120° with respect to each other.

The radiation member 204 extends through a plane of the slot-loaded patch. Preferably, the radiation member 204 is disposed at a substantially right angle to the plane of the slot-loaded patch. Further, the radiation member 204 is configured as a grounded monopole, and comprises a planar ground plane 210, and an elongate conductor 212. The elongate conductor 212 is physically isolated from the ground plane 210, and extends from the ground plane 210, terminating proximate the centre portion of the slot-shaped aperture, between the upper and lower surfaces of the conductive layer 206. With this configuration, the field distributions produced by the antenna will be symmetric. Alternately, however, for non-symmetric field distributions, the elongate conductor 212 may terminate at a position that is off-centre. Preferably, the elongate conductor 212 extends vertically upwards through the ground plane 210 towards the slot-shaped aperture, from a feed point 214 that is disposed below the ground plane 210.

The antenna 200 may include a dielectric substrate (not shown) that is disposed between the conductive layer 206 and the ground plane 210. In this implementation, the conductive layer 206 and the ground plane 210 are disposed on opposite faces of the dielectric substrate. Further, the dielectric substrate is configured with a through-hole through which the elongate conductor 212 extends between the ground plane 210 and the conductive layer 206.

As shown, the ground plane 210 may be oriented substantially parallel to the planar conductive layer 206. With this configuration, the elongate conductor 212 is disposed at a substantially right angle to the planar conductive layer 206 and the ground plane 210. Alternately, however, the planar conductive layer 206 may be inclined relative to the ground plane 210 at an angle other than a right angle.

The end of the elongate conductor 212 that is opposite the feed point 214 ("terminal end") may be disposed within the region 216 of the intersection of the intersecting slots 208a, 208b, between the upper and lower surfaces of the slot-loaded patch. Alternately, the terminal end may be disposed above the upper surface of the slot-loaded patch. The terminal end of the elongate conductor 212 is physically isolated from the slot-loaded patch. As a result, the radiation member 204 is electromagnetically coupled to the slot-loaded patch.

Alternately, the radiation member 204 may be configured as a dipole that is electromagnetically coupled at the opposite ends thereof to respective patch antenna structures 202. As in the previous example, the radiation member 204 may comprise an elongate member whose opposite ends are physically isolated from the slot-loaded patches and terminate proximate the centre portion of the respective slot-shaped apertures.

As discussed above, the communication subsystem 102 may be provided with a plurality of the antennas 200. In a preferred implementation, the conductive layer 206 comprises a plurality of slot-shaped apertures that are disposed uniformly on a common planar conductive layer 206. In this variation, the antennas 200 may be disposed uniformly over the conductive layer 206, thereby providing a planar antenna array. Alternately, the conductive layer 206 may have a cylindrical configuration, with the plurality of slot-shaped apertures being disposed uniformly over the cylindrical conductive layer 206. In this latter variation, preferably each radiation member 204 is disposed at a substantially right angle to the plane of the associated slot-shaped aperture, at the centre portion of the associated slot-shaped aperture.

As is known to persons of skill in the art, the length of a conventional monopole is one-quarter of the wavelength of the fundamental. However, due to the electromagnetic coupling between the radiation member 204 and the slot-loaded patch, the length of the elongate conductor 212 is less than one-quarter of the wavelength (when the radiation member 204 is configured as a grounded monopole). As a result, the height of the antenna 200 may be less than a conventional monopole antenna having the same minimum resonant frequency. Further, the antenna 200 does not exhibit the power loss that would otherwise occur if the radiation member 204 was electrically connected to the slot-loaded patch.

As is also known to persons of skill in the art, the electric field of a conventional monopole is polarized in the direction of the monopole. Therefore, the electric field of the antenna 200 includes a vertically-polarized electric field. However, due to the electromagnetic coupling between the radiation member 204 and the slot-loaded patch, the radiation member 204 induces electric currents in the slot-loaded patch. Since the intersecting slots 208a, 208b of the slot-loaded patch are disposed at a substantially right angle to each other, the electromagnetic field produced by the antenna 200 also includes two perpendicular horizontally-polarized electric fields. As a result, the electromagnetic field produced by the antenna 200 has three orthogonal polarized electric fields (i.e. three-fold polarization diversity).

Figure 3:
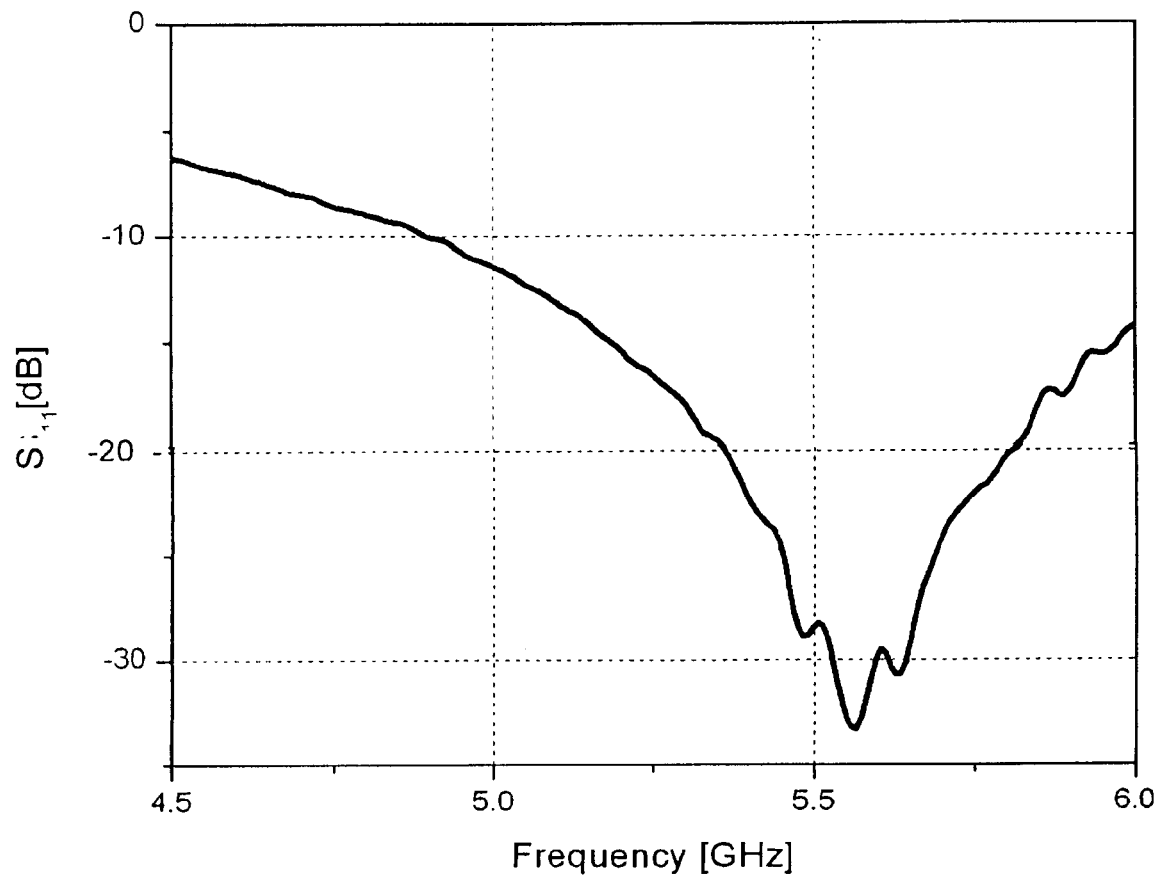
FIG. 3 depicts the measured return loss for a WLAN embodiment of the three-fold polarization diversity antenna.

FIG. 3 depicts the measured return loss for one implementation of the antenna 200. In this implementation, the conductive layer 206 and the ground plane 210 are substantially square, and the dimensions of the antenna 200 are as follows:

$L_1$=75 mm
$L_2$=23 mm
$L_3$=28 mm
W=1.5 mm
H=10 mm where:

$L_1$ is the length of each side of the ground plane 210;
$L_2$ is the length of each side of the conductive layer 206;
$L_3$ is the length of each of the intersecting slots 208a, 208b;
W is the width of each of the intersecting slots 208a, 208b; and
H is the length of the elongate conductor 212.

As shown, the frequency range of the antenna 200 covers WLAN IEEE 802.11b/g (4.9-6 GHz).

Figure 4:
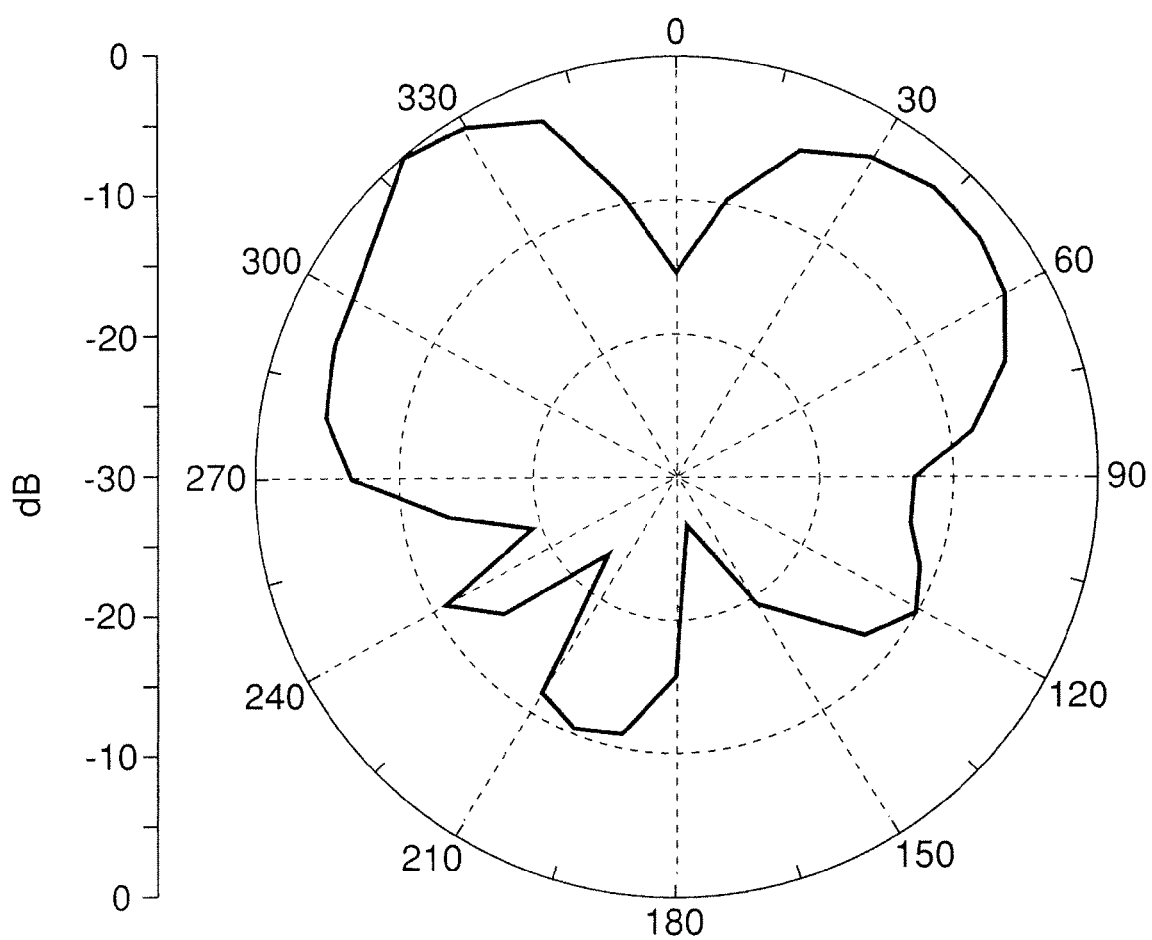
FIG. 4 depicts the radiation pattern of the three-fold polarization diversity antenna of FIG. 3.

FIG. 4 depicts the radiation pattern of the foregoing implementation of the antenna 200, measured at 5.5 GHz. As shown, at this WLAN frequency the electromagnetic field of the antenna 200 has two perpendicular horizontally-polarized electric fields, with good isolation between the electric fields.

Figure 5:
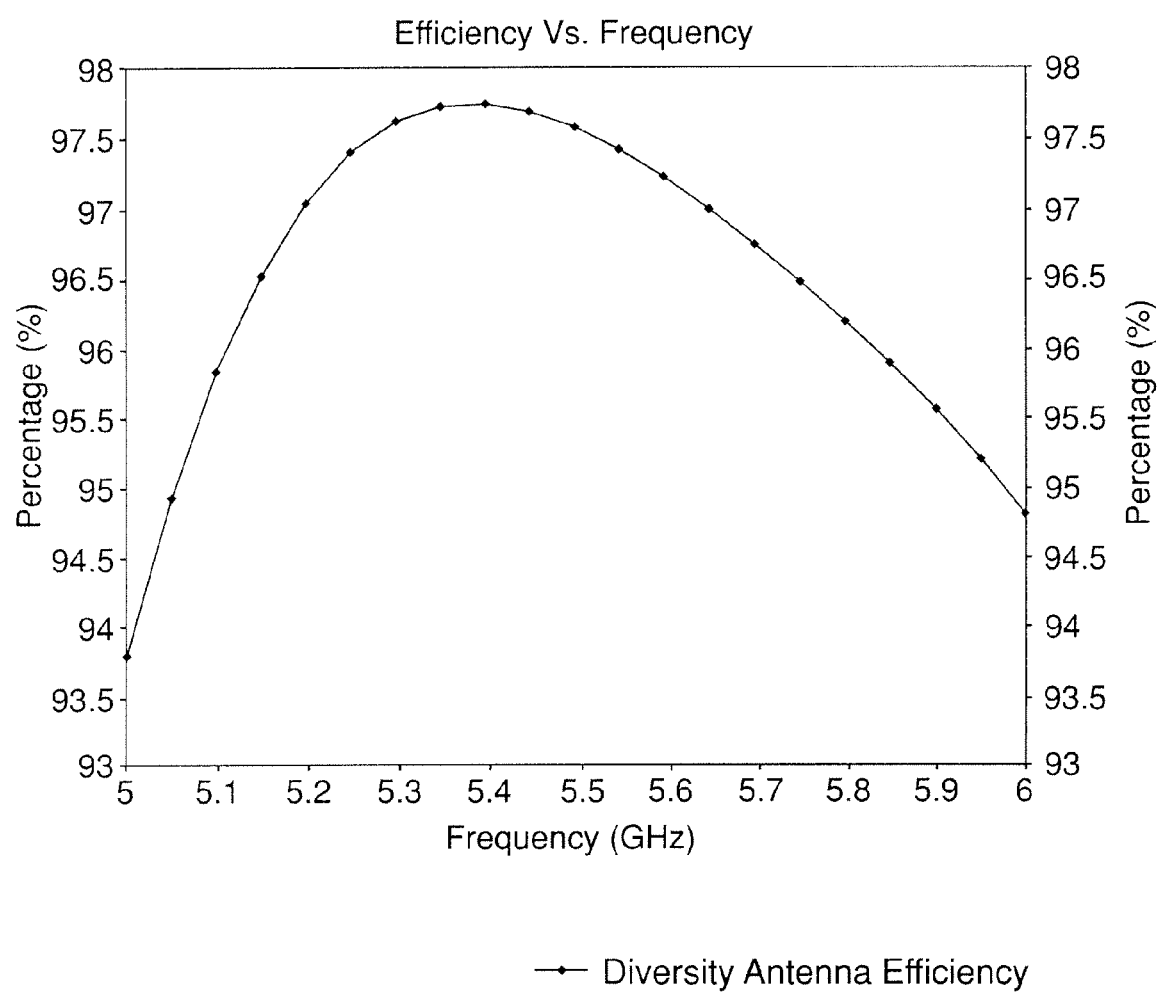
FIG. 5 depicts the efficiency of the three-fold polarization diversity antenna of FIG. 3.

FIG. 5 depicts the efficiency of the foregoing implementation of the antenna 200. As shown, the antenna 200 exhibits good efficiency across the WLAN band, notwithstanding the multiple polarization diversity of the antenna 200.

We claim:

1. A polarization diversity antenna comprising:
  a patch antenna comprising a slot extending through a conductive layer mounted over a ground plane; and
  an elongate radiation member extending through a plane of the patch antenna and having one end located within the slot, the one end being physically isolated from the slot, and an opposite end extending from the ground plane and forming a single feed point for the diversity antenna, wherein in operation the diversity antenna has vertically polarized and horizontally polarized radiation patterns corresponding to the polarization of the radiation member and the patch antenna respectively.

2. The polarization diversity antenna according to claim 1, wherein the radiation member is disposed at a substantially right angle to the plane of the patch antenna.

3. The polarization diversity antenna according to claim 2, wherein the diversity antenna has a three-fold polarization comprising said vertically polarized and two perpendicular horizontally polarized radiation patterns, the two perpendicular horizontally polarized radiation patterns being produced by the slot, wherein the slot comprises a pair of intersecting slots extending through a planar conductive layer, the intersecting slots being disposed at a substantially right angle to each other.

4. The polarization diversity antenna according to claim 1, wherein the patch antenna comprises a cross-slot-shaped through-hole extending through a planar conductive layer.

5. The polarization diversity antenna according to claim 4, wherein the radiation member comprises a monopole that extends between a feed point and a centre of the cross-slot-shaped through-hole.

6. The polarization diversity antenna according to claim 5, wherein the ground plane is substantially parallel to the planar conductive layer.

7. The polarization diversity antenna according to claim 6, wherein the elongate conductor is disposed at a substantially right angle to the planar conductive layer and the ground plane.

8. A wireless communications device comprising: a radio transceiver section; and a polarization diversity antenna coupled to the radio transceiver section, the polarization diversity antenna comprising: a slot-loaded patch antenna comprising a slot extending through a conductive layer mounted over a ground plane; and an elongate radiation member electromagnetically coupled to the slot-loaded patch, the radiation member extending through a plane of the slot-loaded patch antenna and having one end located within the slot, the one end being physically isolated from the slot, and an opposite end extending from the ground plane and forming a single feed point for the diversity antenna, wherein in operation the diversity antenna has vertically polarized and horizontally polarized radiation patterns corresponding to the polarization of the radiation member and the patch antenna respectively.

9. The communications device according to claim 8, wherein the radiation member is disposed at a substantially right angle to the plane of the slot-loaded patch.

10. The communications device according to claim 9, wherein the slot-loaded patch comprises a pair of intersecting slots extending through a planar conductive layer, the intersecting slots being disposed at a substantially right angle to each other.

11. The communications device according to claim 8, wherein the slot-loaded patch comprises a cross-slot-shaped through-hole extending through a planar conductive layer.

12. The communications device according to claim 8, wherein the radiation member comprises a monopole that extends between a feed point and a centre of the cross-slot-shaped through-hole.

13. The communications device according to claim 12, wherein the ground plane is substantially parallel to the planar conductive layer.

14. The communications device according to claim 13, wherein the elongate conductor is disposed at a substantially right angle to the planar conductive layer and the ground plane.

15. The communications device according to claim 8, configured as a wireless base station.

* * * * *